Patented Nov. 13, 1945

2,388,719

UNITED STATES PATENT OFFICE 2,388,719

SOLIDIFIED UNSTABLE COMPOUNDS

Sol B. Wiczer, Washington, D. C.

No Drawing. Application April 9, 1942,
Serial No. 438,330

8 Claims. (Cl. 44—7)

The present invention relates to the stabilization of unstable organic liquids by solidifying the organic liquids and it particularly relates to the stabilization of motor fuels containing metallo-organic compounds to increase the antidetonant value or the octane rating of the motor fuel and to the stabilization of the metallo-organic compounds per se.

More particularly it relates to the stabilization by solidification of hydrocarbon motor fuels containing hydrocarbons having a boiling point within the gasoline range and having incorporated therein a metallo-organic compound, such as tetra-ethyl lead or nickel or iron carbonyl.

The primary object of the present invention embraces the use of a new type of solidifying agent for organic liquids, such as motor fuel, having the double function of solidifying the fuel and chemically stabilizing the unstable constituents of the motor fuel, such as metallo-organic compounds, e. g., lead tetra-ethyl. The solidifying agent, when present in the motor fuel in an amount sufficient to solidify the same at storage temperature, stabilizes the metallo-organic compounds blended in the motor fuel by stabilization against catalytic deterioration of the metallo-organic compounds by the action of light or atmospheric oxygen. The solidifying agent may also stabilize the metallo-organic compound when stored separately prior to blending in the gasoline.

Another object is to provide a method of solidifying fuels containing metallo-organic compounds, or to solidify the metallo-organic compounds per se, which permits the fuel and/or metallo-organic compound to be stored for long periods of time without deterioration and with a reduction of fire hazard.

Broadly, this invention embraces the concept of employing amorphous bodies in the solidification of organic liquids such as leaded gasoline or lead tetra-ethyl concentrate. These amorphous bodies have limited solubility in the organic liquids to the extent that a supersaturated solution may be produced by a minor proportion by weight of said amorphous bodies when dissolved in the organic liquids. The supersaturated solution may result from increasing the solubility of the amorphous body in the organic liquid by a heat treatment or by decreasing the solubility of the said amorphous body in the organic liquid by the addition of other compounds to the organic liquid which will produce this result.

The amorphous bodies are fatty compounds, preferably esters, such as glycerides, which have been further oxidized, phosphated or sulfated. Such compounds have a higher molecular weight than simple esters by reason of having been oxidized and polymerized, phosphated or sulfated. The aliphatic radicals of these esters range upward of ten carbon atoms and preferably comprise twelve to twenty carbon atoms. One or more thereof are combined with glycerides or glycol, as esters, and may be further oxidized and polymerized but preferably contain one or more phosphate or sulfate radicals, as such or as alkali metal or ammonia salts. As examples are the natural phosphatides such as lecithin or cephalin. Other examples are oxidized and polymerized animal, vegetable or fish oils.

These oxidized and polymerized animal, vegetable or fish oils are prepared according to the teaching in U. S. Patent No. 2,214,749. The vegetable oils include such oils as corn oil, soy bean oil, cottonseed oil, coconut oil, China-wood oil, linseed oil oiticica oil and tallow. The fish oils include such oils as manhaden oil, cod-liver oil and sardine oil.

According to U. S. Patent No. 2,214,749, fatty oils are subjected to heat oxidation until a substantial increase in viscosity is obtained. Such oxidation consists in air blowing or ozonizing fatty oils indicated. For example, such oils are treated by air blowing at a temperature of 300–400° F. from 7–24 hours until a substantial increase in viscosity is obtained.

According to the present invention oxidized oils are added in quantity exceeding their normal solubility in the liquid to be solidified.

Heretofore amorphous substances have been employed in the solidification of fuels. These amorphous substances are generally organic bodies which may be dissolved in the fuel with a solubility differential at different temperatures. For example, ordinary soap has been used to form a sol. The soap is formed in the fuel with or without the addition of a small amount of solvent, such as alcohol—for example, gasoline containing dissolved fatty acids saponified with alcoholic alkali. The mixture is allowed to cool, whereupon it sets to a gel. It is to be understood that the gel-forming substance is one which will dissolve in the fuel or form a sol under abnormal conditions and can be caused to set under normal conditions. Besides various soaps, it has been proposed to employ albumens, gelatin, nitrocellulose and the like, in the preparation of solidified gasoline, alcohols, etc.

The gel is a honeycomb of tiny cells formed by the amorphous soap or other gel-forming substance, which sets in a rigid structure, each cell being filled with the liquid gasoline. At the condition of gelation, the gel-forming substance has separated from the solvent gasoline by a process comparable to crystallization but, since the gel-forming substance is amorphous or non-crystalline, it separates in the amorphous honeycomb structure under the lower solubility conditions. Thus, while the fuel assumes the aspect of a solid, the liquid fuel is easily recoverable as such by simple pressure, analogous to squeezing a saturated sponge.

In order to recover the fuel from a large storage tank, it is now proposed, as a new method of separation, to pump water into the bottom of the tank, the floated gel being compressed by the water against any kind of fine screen or porous filter. Thus, gasoline is merely withdrawn as it is needed by pumping water into the storage tank under sufficient pressure to squeeze the gasoline out of the gel.

Other liquids besides water may be employed to separate the gasoline or other fuel from the solidifying agent. In general, any compression method is suitable which exerts sufficient pressure upon the solidified fuel to effect a separation or extraction of the fuel from the solidifying agent. Alternately, it is possible to employ additional substances which will dissolve out the solidifying agent and leave the fuel. The particular substance utilized will depend upon the solidifying agent employed.

As comparable to a process of crystallization, small quantities of the gel-forming agent remain in the gasoline after the extraction step and the presence therein is detrimental. The gel-forming agent either forms a residue on combustion in the motor, such as soap residue (metal oxide from combustion of the soap), or produces an undesirable effect upon combustion leaving a gummy deposit in the carburetor or manifolds. The anti-knock value of the extracted fuel has been so undesirable as to make the use of solidified fuels impractical.

The present invention includes a solidifying agent whose presence is highly desirable. A simple example is a phosphatide such as cephalin or lecithin. This re-agent is entirely combustible without residue and is outstanding as an anti-oxidant and stabilizer, particularly for leaded gasoline (containing lead tetra-ethyl) in storage. It is proposed herein to use this reagent in gasoline in quantity and under conditions suitable to maintain the fuel in a solidified or gel form. When the fuel is recovered in liquid form for use it is not only stable, but any presence of lecithin therein is highly desirable.

Example I

A simple way to form a gel of gasoline with lecithin is to dissolve about 2% of lecithin in leaded gasoline by warming and with agitation. This percentage is merely exemplary. It will be understood that lecithin will be added in a quantity exceeding its maximum solubility in the fuel at normal storage temperatures. The fuel is placed in the final storage tank while warm and, upon cooling, the mixture will set to a gel. Where the storage area is in a tropical country, the fuel in the storage tank may be agitated with a small quantity of very dilute aqueous alcohol, acetone or fine water droplets which reduces the solubility of the lecithin and the quiescent mixture will set to a gel when allowed to stand for a time.

Example II

Ethyl concentrate comprising a mixture of a major proportion of lead tetra-ethyl and minor proportions of ethylene di-bromide, mono-chloro naphthalene and a dye is warmed up with lecithin at a temperature of about 100° F. The lecithin is corn lecithin and is present in about 6% by weight. The lecithin-ethyl concentrate solution is warmed until a clear solution results, preferably with agitation of the solution during the heat treatment. Acetone is then added dropwise to the clear solution to reduce the solubility of the lecithin until the solution becomes cloudy to indicate incipient immiscibility. The solution is then allowed to cool whereupon it sets to a gel.

Example III

Aviation gasoline, containing 3 cc. of lead tetra-ethyl per gallon, is warmed to 80° F. Polymerized oxidized fish oil, prepared as described in U. S. Patent No. 2,214,749, is added until incipient cloud formation results, preferably with agitation. The gasoline is cooled to normal temperature whereupon it sets to a gel. The cooling may be natural or mechanical.

Various types of phosphatides may be used, such as corn oil, soy bean oil or other lecithins, and may be used in crude or pure state. When the lecithin contains as an impurity, fatty oils, it may be improved by partial saponification with ammonia under pressure.

It will be possible to recover the lecithin for reuse if desired.

As another procedure, the lecithin may be used in quantity only sufficient to give the thixotropic gel which will revert to a sol upon agitation. The creamy sol may be transported thus by pumps and will set to a gel in storage or transportation tanks. The gel may thus be formed at the gasoline refinery and broken to recover gasoline just prior to use by filtering through a screen, chamois or any spongy or porous material.

It is to be understood that the lecithin will be used in quantity greater than the solubility in the fuel at normal temperatures. Thus, solubility will vary with different fuels particularly as the fuel may contain moisture or polar solvents such as alcohol or acetone, and must be adjusted from .5–5% by weight of fuel.

It is to be understood that the percentage of phosphatide used may vary and that it is necessary to use an amount sufficient to gel or solidify the fuel or form a thixotropic gel, the amount depending upon the temperature of storage of said fuel.

Modifications of this invention will be apparent to those skilled in the art without departing from the spirit of the invention.

Having described the invention, what is claimed as new is:

1. A hydrocarbon motor fuel containing hydrocarbons having a boiling point within the gasoline range and a minor proportion of lead tetra-ethyl, solidified by lecithin present in an amount greater than its solubility in the fuel at normal temperatures and sufficient to gel the fuel.

2. Lead tetra-ethyl concentrate solidified by lecithin present in an amount greater than its solubility in the fuel at normal temperatures and sufficient to gel the fuel.

3. An organic liquid normally tending to oxidize, stabilized and solidified by an amorphous fatty ester selected from the group consisting of oxidized fatty acid glyceride esters, phosphated fatty acid glyceride esters and sulfated fatty acid glyceride esters, said amorphous fatty acid glyceride ester being present in quantity greater than its solubility in the liquid at normal temperatures and sufficient to gel the same.

4. A concentrate of an unstable liquid metalloorganic compound solidified by an amorphous fatty ester selected from the group consisting of oxidized fatty acid glyceride esters, phosphated fatty acid glyceride esters and sulfated fatty acid glyceride esters, said amorphous fatty acid glyceride ester being present in quantity greater than its solubility in the liquid at normal temperatures and sufficient to gel the same.

5. A hydrocarbon motor fuel containing hydrocarbons having a boiling point within the gasoline range and a minor proportion of lead tetra-ethyl, solidified by a phosphatide present in an amount greater than its solubility in the fuel at normal temperatures and sufficient to gel the fuel.

6. In the method of preparing a solidified, normally unstable liquid hydrocarbon fuel, the step of dissolving a phosphatide in the fuel at a higher temperature above a lower temperature at which the fuel is to exist in solidified form, the percentage by weight of phosphatide being present in quantity greater than the solubility thereof in the fuel at said lower temperature and sufficient relative to the percentage by weight of fuel to set the fuel at the lower temperature at which the fuel exists in solidified form.

7. In the method of preparing a stable and solidified leaded gasoline, the step of dissolving lecithin in the gasoline at a higher temperature above a lower temperature at which the gasoline is to exist in solidified form, the percentage by weight of lecithin being present in quantity greater than the solubility thereof in the fuel at said lower temperature and sufficient relative to the percentage by weight of fuel to set the fuel at the lower temperature at which the fuel exists in solidified form.

8. Unstable gasoline normally tending to oxidize, stabilized and solidified by an amorphous fatty ester selected from the group consisting of oxidized fatty acid glyceride esters, phosphated fatty acid glyceride esters and sulfated fatty acid glyceride esters, said amorphous fatty acid glyceride ester being present in quantity greater than its solubility in the liquid at normal temperatures and sufficient to gel the same.

SOL B. WICZER.